(12) United States Patent
Lowry et al.

(10) Patent No.: US 8,447,768 B2
(45) Date of Patent: May 21, 2013

(54) TECHNIQUES FOR GENERICALLY ACCESSING DATA

(75) Inventors: Lee Edward Lowry, Orem, UT (US); Brent Thurgood, Spanish Fork, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 173 days.

(21) Appl. No.: 12/696,849

(22) Filed: Jan. 29, 2010

(65) Prior Publication Data

US 2011/0191308 A1 Aug. 4, 2011

(51) Int. Cl.
*G06F 7/00* (2006.01)
*G06F 17/30* (2006.01)

(52) U.S. Cl.
CPC . *G06F 7/00* (2013.01); *G06F 17/30* (2013.01)
USPC ............ 707/758; 707/760; 707/769; 707/770

(58) Field of Classification Search
None
See application file for complete search history.

(56) References Cited

U.S. PATENT DOCUMENTS

| | | | |
|---|---|---|---|
| 7,505,978 | B2 | 3/2009 | Bodin et al. |
| 7,599,959 | B2 | 10/2009 | Friedrich et al. |
| 7,650,198 | B2 | 1/2010 | Dorgelo et al. |
| 7,805,416 | B1 * | 9/2010 | Compton et al. ............ 707/694 |
| 2004/0138956 | A1 * | 7/2004 | Main et al. ...................... 705/22 |
| 2006/0165040 | A1 * | 7/2006 | Rathod et al. ................ 370/335 |
| 2009/0024594 | A1 | 1/2009 | Nolan et al. |
| 2010/0010999 | A1 | 1/2010 | Gerovac et al. |

OTHER PUBLICATIONS

Professional ADO.NET 3.5 with LINQ and the Entity Framework, by Roger Jennings, Feb. 3, 2009.*
Beginning ASP.NET 3.5: in C# and VB, by Imar Spaanjaars, Mar. 4, 2008.*
"Create Object Models Using Extensible Abstract Model (XAM)", http://xml.netbeans.org/xam-usade.html, Downloaded Jan. 27, 2010, (Nov. 2009).
"UI Guidelines for SAP CRM WebClient User Interface—Version 1.4", https://www.sdn.sab.com/irj/sdn/go/portal/prtroot/docs/library/uuid/302d8152-002b-2b10-34bd-9ffc712dd4b, (May 14, 2008), 103 pgs.
Khosravi, Shahram, "Writing Generic Data Access Code in ASP. NET 2.0 and ADO.NET 2.0", http://msdn.microsoft.com/en-us/library/ms971499.aspx, ADO.NET Technical Articles, (Apr. 2005).
Lysle, Scott, "Generic Data Access using LINQ to SQL and C#",http://www.c-sharpcorner.com/UploadFile/scottlysle/GenericL2SinCS07212008041344AM/GenericL2SinCS.aspx, Mindcracker LLC, (Jul. 22, 2008).

* cited by examiner

*Primary Examiner* — Jay Morrison
(74) *Attorney, Agent, or Firm* — Schwegman, Lundberg & Woessner, P.A.

(57) ABSTRACT

Techniques for generic data access are provided. A middle-tier server agent uses data providers that can communicate with backend resources. A request received in a first format is used to identify a specific data provider by the middle-tier server agent; the data provider uses the first format to communicate with a specific backend resource in a second format. Results from the specific backend resource are returned from the data provider in the first format and passed to a client that initially made the request.

16 Claims, 3 Drawing Sheets

TECHNIQUES FOR GENERICALLY ACCESSING DATA

BACKGROUND

In a client-server environment, clients generally have user interface (UI) code to make calls to backend data systems or even intermediary systems, which directly access the backend systems, for access to data. The client UI is often tightly coupled to the intermediary or backend systems. Consequently, when changes are made to the back end, the client UI needs updated or needs an entirely new client UI created.

Moreover, the ability to cache data associated with a backend system is often extremely dependent on the format, structure, and features of the back-end system. So, the client UI often has to include specifics about the backend systems in order to properly cache data from the backend system.

When the client UI lacks the ability to cache backend systems, the client experiences performance degradation, such that processing throughput diminishes or response times decrease. As a result, a user on the client may blame the service provider of the back-end system. So, the service provider may lose customers and business when client caching capabilities do not exist.

Furthermore, an enterprise, which supports multiple client UI's and their disparate environments, experience substantial support issues when backend systems are upgraded, changed, and/or swapped out for other different or replacement backend system. For example, consider an enterprise environment with 1,000 clients; each client has a specific client UI to access a Structured Query Language (SQL) backend database. When the backend database is switched or upgraded, the enterprise has to visit and update 1,000 client machines to install or cause to be installed an updated client UI.

Thus, it can be seen that improved techniques for accessing data are needed.

SUMMARY

In various embodiments, techniques for generically accessing data are presented. More specifically, and in an embodiment, a method for generically accessing data is provided. Specifically, a data request is received on a server for a backend resource from a client. The data request in a first format and the backend resource recognizes and processes a second format that is different from the first format. Next, a data provider is located on the server; the data provider communicates with the backend resource in the second format. Moreover, the data provider is used to process the data request in the second format. Results are acquired from the data provider in the first format and the results are provided to the client in the first format.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

Various embodiments of this invention can be implemented in existing network architectures. For example, in some embodiments, the techniques presented herein are implemented in whole or in part in the Novell® network and proxy server products, operating system products, directory-based products and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1:
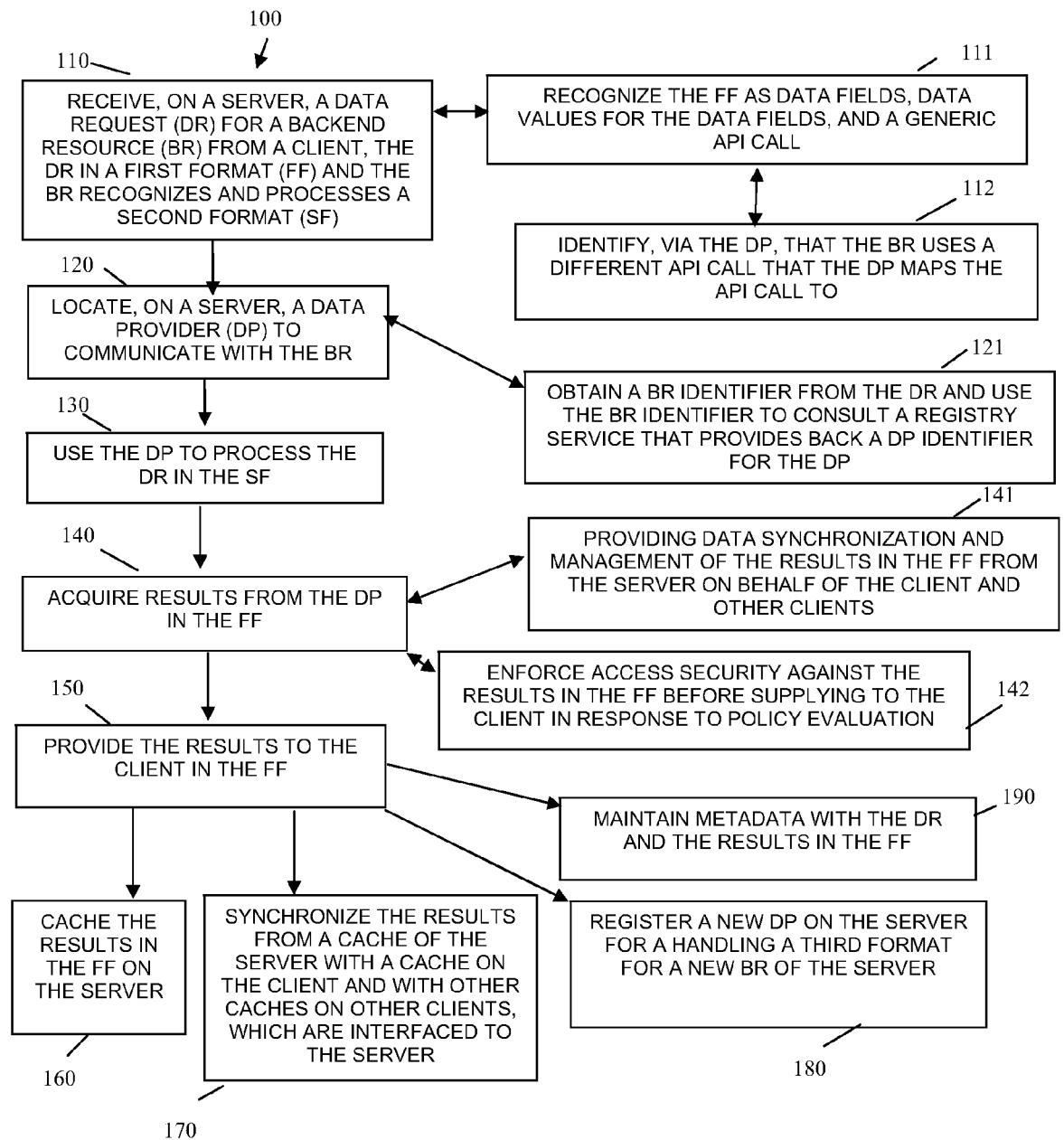
FIG. 1 is a diagram of a method for generically accessing data, according to an example embodiment.
Figure 2:
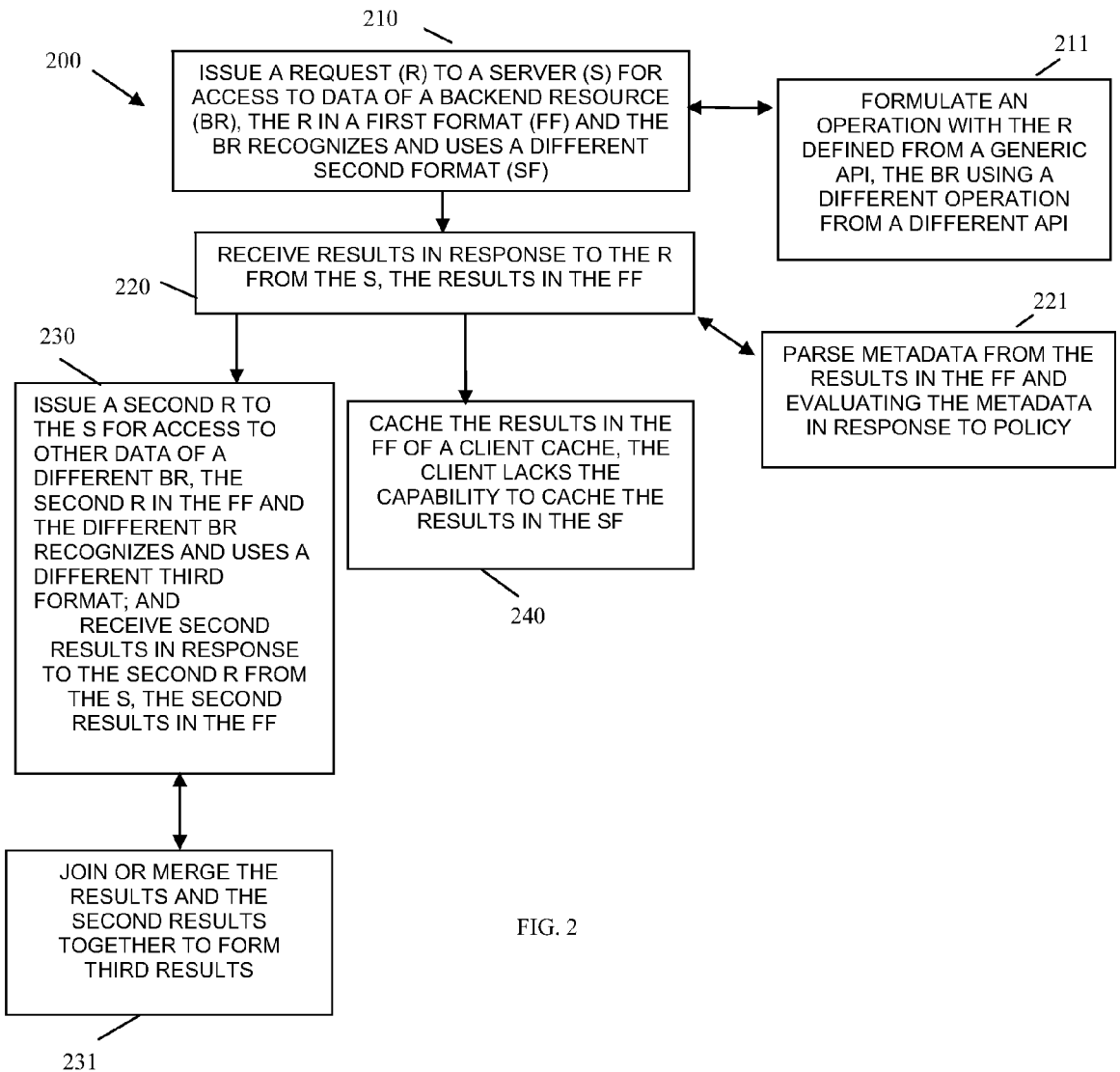
FIG. 2 is a diagram of another method for generically accessing data, according to an example embodiment.
Figure 3:
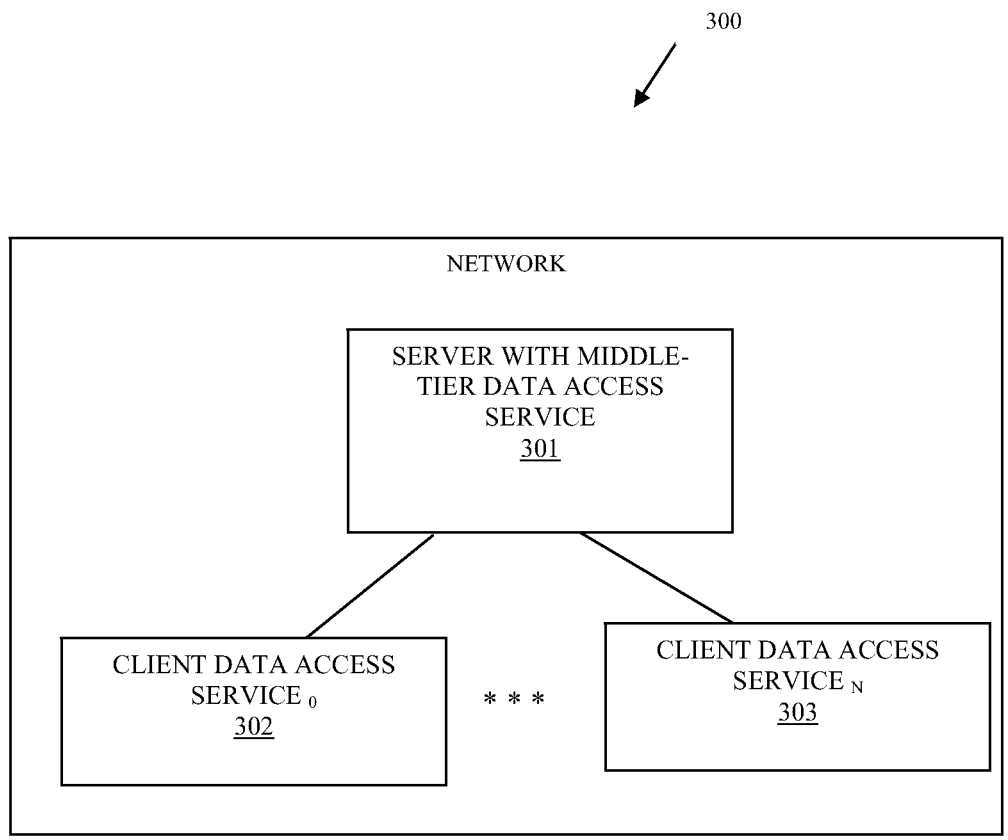
FIG. 3 is a diagram of a generic data access system, according to an example embodiment.

It is within this context that embodiments of the invention are now discussed within the context of FIGS. 1-3.

FIG. 1 is a diagram of a method 100 for generically accessing data, according to an example embodiment. The method 100 (hereinafter "middle-tier data access service") is implemented in a machine-accessible and computer-readable medium and instructions that execute on one or more processors (machines, computers, processors, etc.), such as a server. The machine is specifically configured to process the middle-tier data access service. Furthermore, the middle-tier data access service is operational over and processes within a network. The network may be wired, wireless, or a combination of wired and wireless.

In an embodiment, the middle-tier data access service acts generic intermediary for a plurality of disparate backend data resources. That is, the middle-tier data access service receives generic requests for access to specific ones of the backend resources and uses data providers to interface in data formats and with specific Applicant Programming Interface (API) calls understood by each of the backend resources. Results acquired from the backend resources are translated to generic formats and delivered to clients for manipulation, caching, and use on those clients in the generic data formats using generic API calls. More detailed descriptions and embodiments of the middle-tier data access service are now presented with reference to the FIG. 1.

At 110, the middle-tier data access service receives a data request for a backend resource from a client. The client uses a generic client User Interface (UI) to interact with the middle-tier data access service and make the data request. Moreover, the data request can include a variety of information. The data request itself is in a first format whereas the backend resource expects and can only process a second format. The first and second formats are different and disparate from one another. The backend resource can include a variety of resources, such as databases, data warehouses, custom applications, etc.

According to an embodiment, at 111, the middle-tier data access service recognizes the first format as data fields, data values for the data fields, and a generic Application Programming Interface (API) call or operation. For example, the data request may indicate "get Firstname=Lee from source=EMP_DB," here the data fields are Firstname and source, the data values are Lee and EMP_DB (Employee Database) and the API call is "get."

Continuing with the embodiment of 111 and at 112, the middle-tier data access service identifies via a data provider (discussed below with respect to the processing at 120) that the backend resource uses different API call that the data provider maps to the API call made in the first format. So, the backend resource maybe an SQL database and the entire request identified in 111 may be translated by the data provider into the following: "search employees where fname is Lee," here the different API call is "search" and not "get" as was used with the data request, fname is used as opposed to Firstname and employees is used as opposed to source=EMP_DB; in fact, the entire structure is different.

At 120, the middle-tier data access service locates a data provider to communicate with the backend resource. The data provider can be located on the server that executes the middle-tier data access service or on an entirely different server (one not executing the middle-tier data access service). Data providers are services that can translate between the first format (generic format) and specific data formats (second format and others) that are expected by particular backend resources. The middle-tier data access service locates the data provider that can interface with the backend resource based on the data request that is made.

For example, at 121, the middle-tier data access service obtains a backend resource identifier from the initial data request. The backend resource identifier is used to consult a registry service that provides back a data provider identifier for the data provider that can interact with the backend resource. Other approaches may be used as well, such as the middle-tier data access service may itself maintain a table that maps backend resources to particular data providers, and the like.

At 130, the middle-tier data access service uses the data provider to process the data request in the second format. That is, the data provider takes the data request in the first format and translates and maps it into data and commands that are recognizable and capable of being processed by the backend resource.

At 140, the middle-tier data access service acquires results from processing the data request in the first format (generic format). The data provider provides back to the middle-tier data access service the results in the first format. The backend resource provided the results in the second format and again the data provider performed a reverse translation and mapping to place the results in the first format, which are then supplied to the middle-tier data access service.

In an embodiment, at 141, the middle-tier data access service provides data synchronization and management of the results in the first format (generic or normalized format) on behalf of the client and other clients of the client-server architecture and the network.

In another situation, at 142, the middle-tier data access service enforces access security against the results in the first format before supplying to the client in response to policy evaluation. So, the middle-tier data access service can redact information or forbid certain parts of information contained in the results from reaching the client in response to the policy evaluation.

At 150, the middle-tier data access service provides the results to the client in the first format. So, the client makes a data request in a generic first format and then receives back results in the generic first format. However, the actual interface to the second and specific format was provided through the data provider in a manner that is entirely transparent to the client and the client UI. Therefore, the client UI can be generic and provide services based on just the generic first format.

According to an embodiment, at 160, the middle-tier data access service caches the results in the first format on the server that processes the middle-tier data access service.

In a specific situation, at 170, the middle-tier data access service synchronizes the results and/or allows the synchronization of the results from a global cache of the server to a cache on the client and to other caches on other clients, which are interfaced to the server.

In another situation, at 180, the middle-tier data access service registers a new data provider on the server for handling a third format for a new backend resource of the server. Thus, a registration service for registering data providers can be provided via the middle-tier data access service.

In another case, at 190, the middle-tier data access service maintains metadata with the data request and the results in the first format. The metadata can include a variety of information, such a principal identifier for a principal (user or automated service) that made the data request, a backend resource identifier, a data provider identifier, an operation identifier for any operation performed with the data request, a date and time stamp, an indication as to policy used and whether policy was violated, and the like. The metadata can be used to assist in enforcing security, auditing, logging, and reporting.

FIG. 2 is a diagram of another method 200 for generically accessing data, according to an example embodiment. The method 200 (hereinafter "client data service") is implemented in a machine-accessible and computer-readable storage medium as instructions that execute on one or more processors of a network node, such as a client. It is noted that multiple instances of the client data service execute on different clients of the network. So, the client data service is operational over a network. The network may be wired, wireless, or a combination of wired and wireless. Furthermore, the processor (client having a processing instance of the client data service) is specifically configured to process the client data service.

The middle-tier data access service represented by the method 100 of the FIG. 1 represents processing from the perspective of a server. The server offers access to a backend resource, such as a database, data warehouse, etc. The client data service represents processing from the perspective of one client on the network that interacts with the server via the middle-tier data access service. It is noted once again that multiple clients exist on the network; each client has a processing instance of the client data service and interacts with the middle-tier data access service in the manners discussed herein above and below.

At 210, the client data service issues a request to a server for access to a backend resource. The request is in a first format but the backend resource uses a second format that is entirely different from the first format that the request is made in. In an embodiment the client data service issues the request to the middle-tier data access service of the method 100 at 110.

According to an embodiment, at 211, the client data service formulates the data request with a specific data access operation (read, write, update, delete, add, etc.). The data access operation selected from a generic API. The backend resource uses a different operation or set of operations to perform the generic API operation this different operation or set of different operations selected from an entirely different API. The translation of the operations and data request in general handled by the data providers discussed above with reference to the method 100 of the FIG. 1.

At 220, the client data service subsequently receives results in response to making the request at 211. The results are received from the server, such as the middle-tier data access service of the method 100. Also, the results are in the first format; that is, the same first format that the client data service issued the data request to the server in.

In an embodiment, at 221, the client data service parses metadata from the results in the first format and evaluates portions of the metadata in response to or based on a policy. So, auditing information can be gleaned from the results and policy may instruct actions to be performed in response to or based on that auditing information.

According to an embodiment, at 230, the client data service issues a second request to the server for other data of a different backend resource of the server. Again, the second request is in the first format and the different backend resource uses a different third format that is different from the first format and the second format used by the backend resource associated with the initial data request. Subsequently, the client data service receives second results in response to the second request from the server and these second results are also in the first format. So, the client data service just processes the generic data format or the first format.

The scenario of 230 presents a variety of novel opportunities. For example, at 231, the client data service can join or merge the results (of 220) and the second results (of 230) to form new third results. Technically, the third results can include data fields not present in the original backend resource and other data fields not present in the different backend resource used with the second data request.

In another case, at 240, the client data service caches the results in the first format in a client cache of a client that processes the client data service. Here, the client lacks the capability to cache or provide caching services for the second format (format required by the backend resource); but, the client can use existing caching services to cache the results in the first format. So, capabilities of clients can be extended via the generic first format processing. Caching can be sensitive to the format of the data and the structure of the data. Some structures may not support caching unless various other special modules are in place. So, in this embodiment, the client and its client cache lacks support to providing caching services for the second format but caching still occurs because the client has the support to cache the first format and the results are provided in the first format (translated by the data provider from the second format to the first format).

FIG. 3 is a diagram of a generic data access system 300, according to an example embodiment. The generic data access system 300 is implemented in a machine-accessible and computer-readable storage medium as instructions that execute on one or more processors (multiprocessor) and that is operational over a network. The one or more processors are specifically configured to process the components of the generic data access system 300. Moreover, the network may be wired, wireless, or a combination of wired and wireless. In an embodiment, the generic data access system 300 implements, among other things, certain aspects of the methods 100 and 200 represented by the FIGS. 1 and 2, respectively.

The generic data access system 300 includes a middle-tier data access service 301 and a plurality of client data access services 302. Each of these and their interactions with one another will now be discussed in turn.

The middle-tier data access service 301 is implemented within and resides within a computer-readable storage medium and is to process on one or more processors of the network that comprise a server. Example aspects of the middle-tier data access service 301 were presented in detail above with reference to the method 100 the FIG. 1.

The middle-tier data access service 301 is configured to receive data requests in a generic format and configured to locate specific data providers that can use the generic format to process the data requests in native formats of backend resources to which the data requests are directed.

According to an embodiment, the middle-tier data access service 301 is configured to manage a global cache that synchronizes the data results with client caches of the clients of the client data access services 302.

In another situation, the middle-tier data access service 301 is configured to enforce access policy against the data requests and the results before providing to the client data access services 302.

Each of the client data access services 302 is implemented within and resides within a computer-readable storage medium. Moreover, each client data access service 302 processes on a client of the network. Example aspects of the client data access services 302 were presented in detail above with reference to the method 200 of the FIG. 2.

The client data access services 302 are configured to issue the data requests to the middle-tier data access service 301 and configured to receive results from the data providers of the middle-tier data access service 301. The data requests issued in the generic format and the results received in the generic format.

In an embodiment, the client data access services 302 are configured to merge or join results from disparate backend resources via the generic format.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a computer-readable storage medium that is executed by one or more processors of a network to perform the method, comprising:

receiving, on a server, a data request for a backend resource from a client, the data request in a first format and the backend resource recognizes and processes a second format;

locating, on another server different from the server, a data provider to communicate with the backend resource, the data provider translates the first format to the second format using a backend Application Programming Interface (API) calls understood by the backend resource;

using the data provider to process the data request in the second format;

acquiring results from the data provider in the first format;

providing the results to the client in the first format;

parsing metadata from the results as auditing information and evaluating portions of the metadata based on a policy to take actions; and assisting in enforcing security, auditing, reporting, and logging based on the auditing information.

2. The method of claim 1 further comprising, caching the results in the first format on the server.

3. The method of claim 1 further comprising, synchronizing the results from a cache of the server with a cache on the client and with other caches on other clients, which are interfaced to the server.

4. The method of claim 1 further comprising, registering a new data provider on the server for a handling a third format for a new backend resource of the server.

5. The method of claim 1 further comprising, maintaining the metadata with the data request and the results in the first format.

6. The method of claim 1, wherein receiving further includes recognizing the first format as data fields, data values for the data fields, and a generic Application Programming interface (API) call.

7. The method of claim 6, wherein recognizing further includes identifying, via the data provider, that the backend resource uses a different API call that the data provider maps the API call to.

8. The method of claim 1, wherein locating further includes obtaining a backend resource identifier from the data request and using the backend resource identifier to consult a registry service that provides back a data provider identifier for the data provider.

9. The method of claim 1, wherein acquiring further includes providing data synchronization and management of the results in the first format from the server on behalf of the client and other clients.

10. The method of claim 1, wherein acquiring further includes enforcing access security against the data results in the first format before supplying to the client in response to policy evaluation.

11. A method implemented and residing within a computer-readable storage medium that is executed by one or more processors of a network to perform the method, comprising:

issuing a request to a server for access to data of a backend resource, the request in a first format and the backend resource recognizes and uses a second format that is different from the first format of the request, the server acts as a generic intermediary for the backend resource and other resources and locates a specific data provider that translates the first format to the second format and the specific data provider on an entirely different server from the server, that data provider using specific Application Programming Interface calls recognized by the backend resource;

receiving results in response to the request from the server, the results in the first format;

parsing results for metadata representing auditing information that is evaluated and actions taken based on a policy; and assisting in enforcing security, auditing, logging, and reporting based on the auditing information.

12. The method of claim 11 further comprising:

issuing a second request to the server for access to other data of a different backend resource, the second request in the first format and the different backend resource recognizes and uses a different third format; and receiving second results in response to the second request from the server, the second results in the first format.

13. The method of claim 12 further comprising, joining or merging the results and the second results together to form third results.

14. The method of claim 11 further comprising, caching the results in the first format in a cache on a client that processes the method, the client lacks the capability to cache the results in the second format.

15. The method of claim 11, wherein issuing further includes formulating an operation with the request defined from a generic Application Programming Interface (API), the backend resource using a different operation from a different API.

16. The method of claim 11, wherein receiving further includes parsing the metadata from the results in the first format and evaluating the metadata in response to policy.

* * * * *